United States Patent [19]

Gerry

[11] 4,095,239

[45] June 13, 1978

[54] DIGITAL COMBINATION LOCK AND MEANS FOR REMOTELY PRESETTING COMBINATION THEREIN

[76] Inventor: Martin E. Gerry, 13452 Winthrope St., Santa Ana, Calif. 92705

[21] Appl. No.: 764,514

[22] Filed: Jan. 31, 1977

Related U.S. Application Data

[63] Continuation of Ser. No. 578,991, May 19, 1975, abandoned.

[51] Int. Cl.[2] .......................... H04Q 3/02; H04Q 3/00

[52] U.S. Cl. ........................ 340/147 MD; 340/164 R; 340/274 C; 340/149 R

[58] Field of Search ........... 340/274 C, 274 R, 164 R, 340/149 H, 147 MD, 149 R; 70/278; 317/134

[56] References Cited

U.S. PATENT DOCUMENTS 3,731,156 5/1973 Watson ........................... 340/274 C

*Primary Examiner*—Harold I. Pitts

[57] ABSTRACT

A digital combination locking system having a plurality of push buttons, each push button allocated to a different numerical digit. The push buttons are connected to selector switches for presetting any desired combination of digits. A plurality of semiconductor switches powered by direct current are serially connected, the last one of the series being connected to an electrical self latching locking mechanism for unlocking the lock upon selection, by operation of the push buttons, of the proper preset combination of digits. An alarm logic circuit is also provided so as to detect when two or more push buttons have been improperly operated or operated out of their proper sequence to set off an alarm that can only be shut off upon properly selecting the preset digit combination. Means are also provided for remotely enabling the presetting or clearing of the combinations of any of a plurality of such digital locking systems.

14 Claims, 13 Drawing Figures

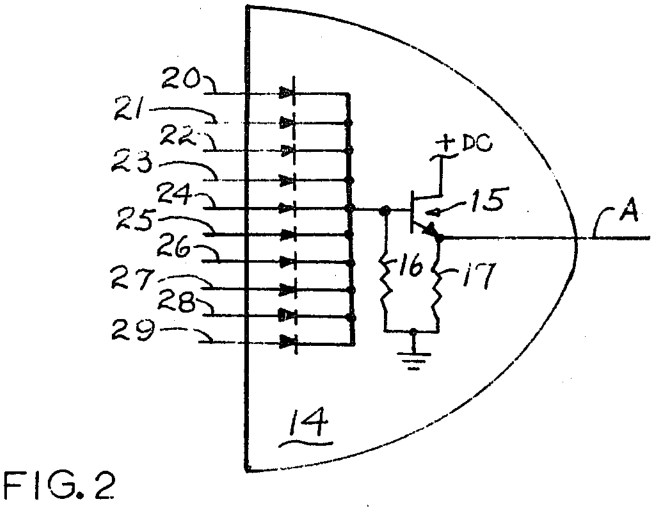
FIG. 2
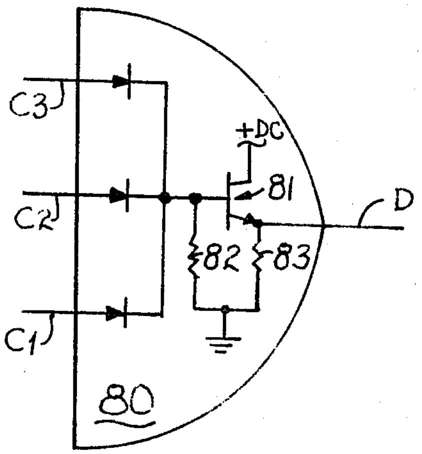
FIG. 3
| INCLUSIVE OR BINARY STATES | | | |
|---|---|---|---|
| C1 | C2 | C3 | D |
| 0 | 0 | 0 | 0 |
| 0 | 0 | 1 | 1 |
| 0 | 1 | 0 | 1 |
| 0 | 1 | 1 | 1 |
| 1 | 1 | 1 | 1 |
| 1 | 1 | 0 | 1 |
| 1 | 0 | 1 | 1 |
| 1 | 0 | 0 | 1 |
FIG. 4

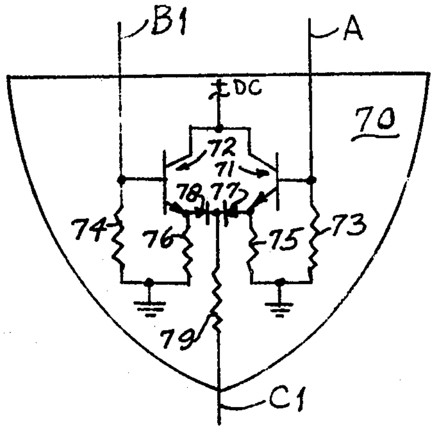
FIG. 5
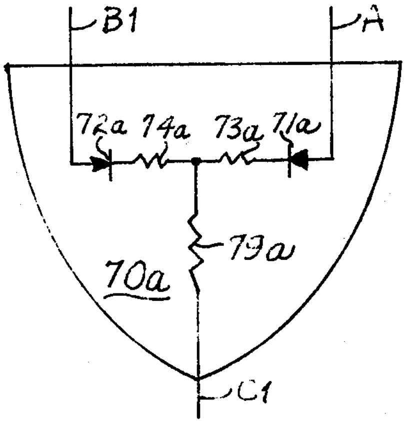
FIG. 6
| EXCLUSIVE OR BINARY STATES | | |
|---|---|---|
| A | B1, B2 or B3 | C1, C2 or C3 |
| 0 | 0 | 0 |
| 1 | 1 | 0 |
| 0 | 1 | 1 |
| 1 | 0 | 1 |
FIG. 7
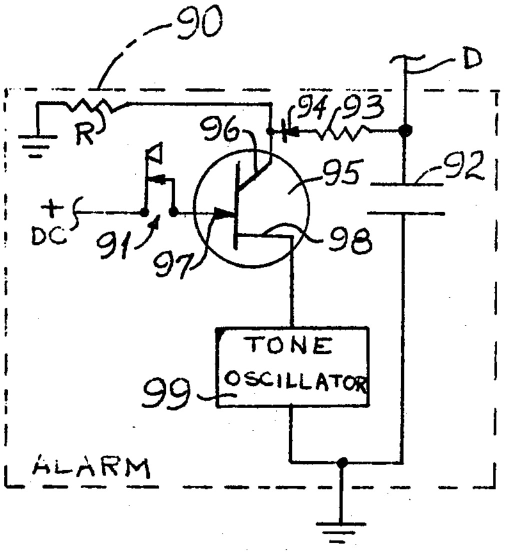
FIG. 8
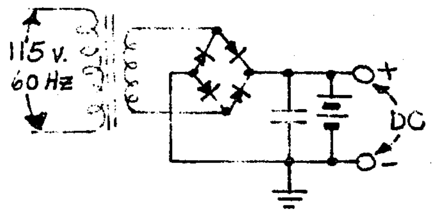
FIG. 9

DIGITAL COMBINATION LOCK AND MEANS FOR REMOTELY PRESETTING COMBINATION THEREIN

CROSS REFERENCE TO RELATED APPLICATION

This application is a continuation of application Ser. No. 578,991 filed May 19, 1975, now abandoned.

BACKGROUND OF THE INVENTION

This invention is in the field of electrically operated push button locks and particularly in the field of such locks having an alarm system for detecting tampering or out of sequence operation of the push buttons of the lock.

Prior art including push button locks in most instances do not have the capability of repeating a particular digit in a combination of digits.

Such prior art locks do not have semiconductor logic means for detecting when a wrong digit has been selected or when a digit was selected out of its proper sequence and to set off an alarm as a result of such detection.

Further, such prior art locks, if they do have logic circuitry, it is of the type that responds to any wrong digit selection and thereby results in being able to determine the proper digit by merely making 10 attempts, the one attempt not setting off the alarm being the one that selected the proper digit.

The prior art also does not provide to such digital locks the ability to remotely preset or clear any combination within such lock, or locks.

SUMMARY OF THE INVENTION

Hence, it is an objective of the invention to provide an electronic circuit with 10 push buttons wherein that circuit has the capability of being preset to any series of digits and any digit may be repeated.

It is another objective of this invention to provide an alarm circuit that comprises semiconductor logic means for detecting a wrongly selected digit or detecting a digit that has been selected out of sequence.

It is yet a further objective of this invention to provide within the logic means an alarm circuit that responds only to at least two improperly selected digits in order that a proper digit in the sequence could not be determined by operation of the push buttons.

Accordingly, the invention of a digital combination lock provides a plurality of push buttons and combination selector switches for presetting and retrieving any desired combination of digits. A plurality of semiconductor switches serially connected are operatively responsive to pulses from said push buttons. A locking mechanism, that is self latching, is serially connected with the semiconductor switches for opening the locking mechanism when the last in sequence of operation of the semiconductor switches is energized.

A time delay reset switch is provided in series with the semiconductor switches so that the lock is reset to normal upon elapse of a predetermined period of time counted from the time of initiation of the first push button.

Additionally, binary logic means are provided for initiating an alarm signal when the push buttons are manually depressed out of sequence or the wrong push button is depressed.

Means consisting of a master control panel, a modulation system, a filter and electronic switches are provided to enable any desired combination to be preset within the digital locking device or a plurality of such devices, and to also clear any combination set within such devices from a remote location.

BRIEF DESCRIPTION OF THE DRAWINGS

FIG. 2 is a schematic of an inclusive OR gate used in conjunction with each of push buttons of the lock.

FIG. 3 is another schematic of an inclusive OR gate responsive to outputs from exclusive OR gates.

FIG. 4 is a truth table of the several binary states of logic provided by the inclusive OR gate of FIG. 3.

FIG. 5 is a logic schematic of one of the exclusive OR gates utilized in this invention.

FIG. 6 is an alternative logic schematic of an exclusive OR gate.

FIG. 7 is a truth table of the several binary states of logic provided by the exclusive OR gates of FIGS. 5 or 6.

FIG. 8 is a schematic of an alarm circuit triggered by the output of the inclusive OR gate of FIG. 3.

FIG. 9 is a schematic of an AC to DC converter for operating the components of the system of FIG. 1 and for recharging a rechargeable bettery that normally provides power to such system on power failure.

DETAILED DESCRIPTION

Figure 1:
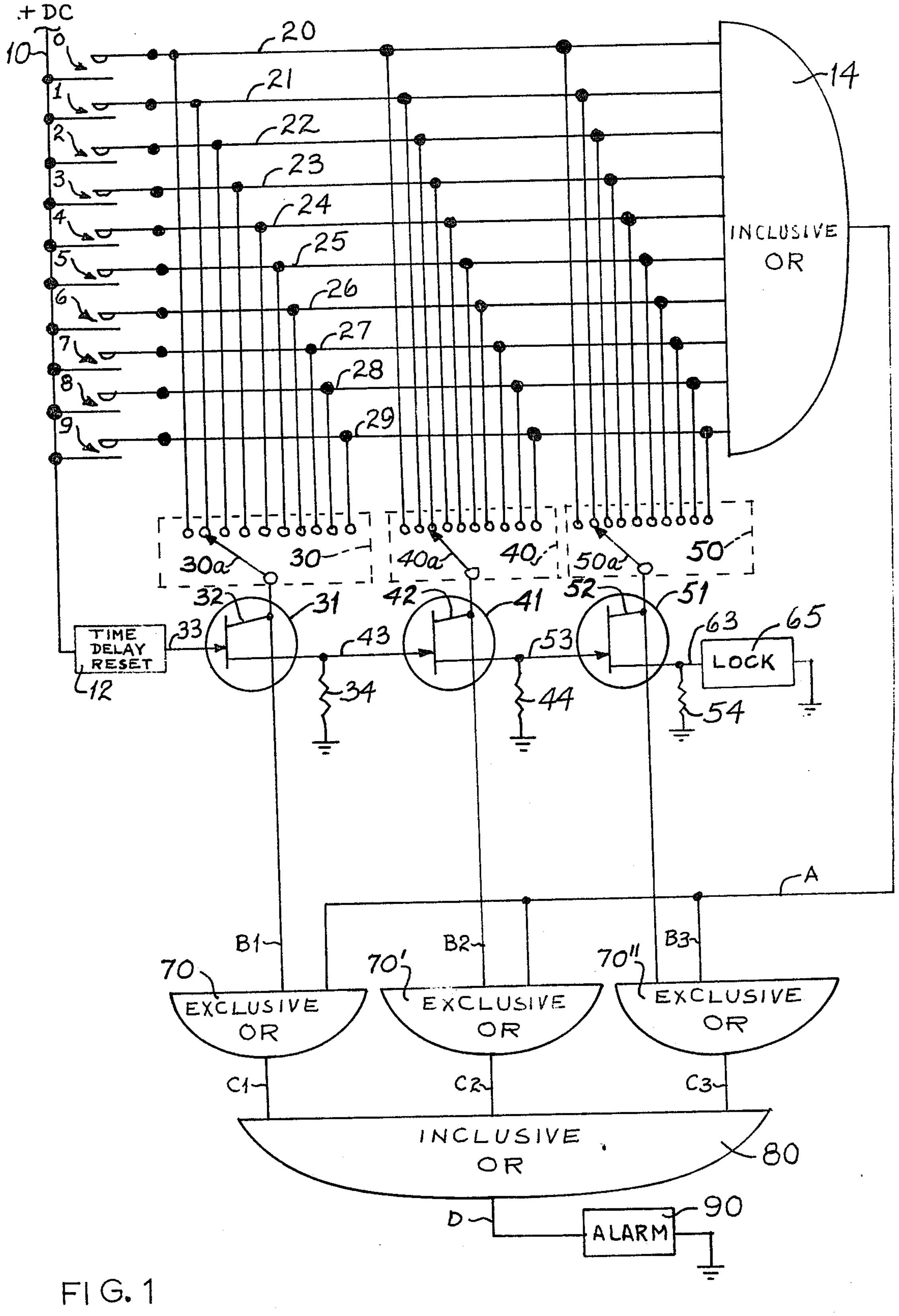
FIG. 1 is an electrical logic system schematic of the push button digital combination lock.

Referring to FIG. 1, a logic system schematic of the push button lock is shown in exemplary fashion. Although normally it might be desired to employ five or six stages of combination, only three such stages are shown for convenience and simplicity. It will be understood that as many additional stages as the second or middle stage may be added, depending on the length of the combinaton of digits desired.

Accordingly, positive direct current potential is provided at bus bar 10. Negative direct current potential as well as signal return path is represented throughout by conventional ground symbols.

Bus bar 10 is electrically connected to stationary contacts of push buttons 0, 1, 2, 3, 4, 5, 6, 7, 8 and 9 and to time delay reset switch 12. Switch 12 is a normally closed switch having a preset time delay period such as thirty seconds delay once current flows through the normally closed contacts thereof (not shown) so as to open the contacts after the preset time period has elapsed and restore the system to its normal inoperative mode. Switch 12 therefore enables restart of selected push button sequence whether successful or unsuccessful in opening the locking mechanism.

Movable contactors of push buttons 0 through 9 are each respectively connected by means of wires 20–29 to inputs of inclusive OR gate 14 and to stationary contacts of each of three selector switches 30, 40 and 50.

In this schematic, movable selector are 30*a* of switch 30 is set to receive power when the contacts of push button 1 cooperate. Likewise, movable selector are 40*a* of switch 40 is set to receive power when contacts of push button 2 cooperate. Similarly, movable selector arm 50*a* of switch 50 is set to receive power when the contacts of push bitton 1 cooperate. Hence, th system is present to activate a locking mechanism after push button operation of the sequence 1-2-1.

Upon push button 1 being first closed, voltage will be applied through selector arm 30*a* to trigger electrode 32 of silicon control rectifier 31, thereby starting current flowing through switch 12 and electrodes 33 and 43 amd through resistor 34. Resistor 34 is provided to maintain current flowing through silicon control rectifier 31 while silicon control rectifier 41 and 51 are still in the non-conductive current states. Under these conditions, exclusive OR gate 70 has a positive pulse applied through its input lead at A, and another positive pulse applied through its input at B1. As will be seen subsequently, these two pulses, each representing the binary ONE state will provide no output from gate 70 at C1.

Similarly, when push button 2 is then closed momentarily a positive pulse will be applied through selector arm 40*a* to trigger 42 of silicon control rectifier 41 to start current flowing therethrough along path 43 and 53 and through resistor 44, there being a DC positive potential already available at 43. Current through rectifier 41 will continue flowing by virtue of the path provided through resistor 44. Also a positive pulse will be provided from inclusive OR gate 14 at A and another positive pulse at B2 as a pair of input positive pulses to exclusive OR gate 70′, providing no output at C2 fom gate 70′.

Finally, when push button 1 is momentarily again closed, a positive pulse will be applied through selector arm 50*a* to trigger 52 of silicon control rectifier 51 to start current flowing between 53 and 63 path therethrough and through resistor 54, there being a DC positive potential already available at 53. Current through rectifier 51 will continue to flow by virtue of the path provided through resistor 54. Also a positive pulse will be provided from inclusive OR gate 14 at A and another positive pulse at B3 as a pair of input positive pulses to exclusive OR gate 70″, providing no output at C3 from gate 70″. The positive potential at 63 will provide electrical energy to activate a self-latching solenoid locking mechanism 65, and withdraw a bar or similar member in a latch-holding action from a door jamb or the like to open and hold the locking mechanism in open mode, mechanism 65 remaining in open mode without power being provided thereto continuously. Mechanism 65 is well known in this art and needs no further detailing.

All the above sequential push button operations that select the proper preset digital code 1-2-1 would have to be performed within the time period of the time delay of reset switch 12. If such preset time period is exceeded, the normally closed contacts thereof will open, and current through whichever of the silicon control rectifiers have been previously energized, will cease to flow restoring the entire circuit to the normally unoperated mode as shown in FIG. 1, so as to enable recycling the system by manipulating the push buttons in the proper preset combination sequence.

It is to be noted that the inclusive OR gates 14 or 80 will respond to any positive pulse input thereto at their respective input terminals, thereby providing outputs at A and D respectively, if at least one pulse is present at their respective inputs.

By correctly pushing buttons 1-2-1 in this particular sequence to which the system is preset, no outputs will be provided at C1, C2 or C3 from exclusive OR gates 70, 70′ or 70″ respectively. Therefore, there being no input to inclusive OR gate 80, there will be no output at D, and alarm 90 will not be activated.

However, should other than the above preset sequence, such as 1-1-2 be used or the wrong digit substituted resulting in sequence 1-9-1 for example, only the output from inclusive OR gate 14 at A will be available to gates 70′ and 70″, and consequently each of these gates will provide an output at C2 and C3 so that there will be an output at D to start alarm 90. Once alarm 90 has been started, it can only be shut off by proper operation of the preset combination, entering through the unlocked door, and disabling the alarm by depressing a push button provided for such purpose.

The details of the selection of the proper code and alarm logic will be more appreciated by discussion of the several OR gates used and their truth tables, below.

Referring to FIG. 2, inclusive OR gate 14 is shown as having inputs from wires 20–29 that provide positive pulses when each of push buttons 0 through 9 of FIG. 1 is depressed. Any of these pulses provide a current through the particular diode with which one of the wires 20–29 is connected in the direction of the arrow head of the particular diode to raise the base of NPN transistor 15 to a positive potential so that current could flow through emitter circuit thereof and resistor 17 to provide a positive output pulse at A. Prior to receiving a positive pulse on any of wires 20–29, the base of transistor 15 is a slight negative potential provided through resistor 16. A positive pulse available at wires 20–29 is sufficient to overcome the negative bias of the base and cause both base and collector current to flow through emitter and resistor 17 to provide output at A. The negatively biased transistor 15, alone without a positive pulse input thereto, will inhibit conduction of current through resistor 17 and the potential at A with respect to ground is said to have the ZERO binary logic state, whereas with at least one positive pulse input overcoming the negative bias a positive voltage with respect to ground will be provided at A and this is referred to as the ONE binary logic state.

Referring to FIGS. 3 and 4, inclusive OR gate 80 is responsive to inputs C1, C2 or C3. Such inputs are either in the form of a positive pulse and defined as the ONE binary logic state, or no input is provided at C1, C2 or C3 in which case the binary ZERO logic state is said to exist. Normally NPN transistor 81 is negatively biased to prevent collector and base current from flowing in emitter by virtue of resistor 82 holding the base slightly negative, in which case the voltage output at D with respect to ground would be zero. However if at least one positive pulse is available at C1, C2 or C3, current will flow through the appropriate diode to raise the base potential positive with respect to the emitter, and collector and base current will flow through the emitter and resistor 83 to ground, to provide a positive potential at D for the ONE binary logic state. With three possible inputs, eight possible combinations of binary logic as shown in truth table of FIG. 4, is possible. It may be seen from this truth table, that only where no pulse exists at C1, C2 or C3 then the binary logic state will be ZERO at output D. Otherwise, with any other combination there will be a ONE binary logic state at output D. This means that under all but the ZERO state at D, alarm 90 will receive an input to help enable such alarm. It will be seen in subsequent discussion of details of alarm circuit 90, that it is desirable to protect the security of the preselected digit combination, for alarm circuit 90 not to respond until at least two positive pulse outputs have been provided at D.

Referring to FIGS. 5 and 7, an exemplary exclusive OR gate is provided at 70. Such exclusive OR gate depends upon two binary logic inputs at A and B1 thereto to provide a binary logic output at C1 therefrom. Similar exclusive OR gates are provided at 70' and 70'' of FIG. 1. As seen from the truth table of FIG. 7, like binary logic states of ZERO or ONE at A and B1 of gate 70 will result in ZERO logic output at C1, whereas unlike binary logic states at A and B1 of gate 70 will result in a binary logic ONE state at output C1 therefrom. In gate 70, two NPN transistors 71 and 72 are used wherein their collectors are commonly connected to positive DC power. Input A is connected to the base of transistor 71 and to resistor 73 for providing a negative potential to the base to prevent transistor 71 from conducting current when no positive pulse is applied at A. Input B1 is connected to the base of transistor 72 and to resistor 74 which provides a negative potential to the base of the transistor to prevent transistor 72 from conducting current when no positive pulse is applied at B1. When a positive pulse is applied at A, the base of transistor 71 will be raised to a positive potential to cause collector and base current to flow in emitter circuit and resistor 75. Likewise when a positive pulse is applied at B1 the base of transistor 72 will be raised to a positive potential to cause collector and base current to flow in emitter circuit and resistor 76. In this situation the potential difference between the two emitter outputs of transistors 71 and 72 will be zero and no cuurrents will flow through diodes 77 or 78 nor through resistor 79, and no pulse will be present at C1. In order for a pulse to be present at C1, either A or B1 should have a binary ZERO or no input applied thereto, in which case a potential difference will exist between the two emitters and current will flow through resistor 79 to provide a pulse at C1. This logic of course is shown by the truth table of FIG. 7.

Referring to FIG. 6 and its truth table of FIG. 7, it may be seen that transistors are not required wherein the pulse level or amplitudes at A and B1 are large. In such case, with only a pulse at A a current through diode **71*a* and resistor 73*a* of exclusive OR gate 70*a* will flow, to provide a current in resistor 79*a* and a pulse at C1. Likewise with only a pulse at B1 a current will flow through diode 72*a*, resistor 74*a* and resistor 79*a* to provide a pulse at C1. But with equal amplitude pulses at A and B1, there will be zero potential difference between diodes 71*a*and 72*a* and no current will flow through resistor 79*a*, and hence no pulse will be present at C1 to produce a ZERO state at C1 in accordance with the truth table of FIG. 7**.

Referring to FIG. 8, and the prior discussion, it was seen that signal to initiate alarm 90 is provided by the presence of a binary logic ONE at D input thereto. To enable a logic ONE to be present at D, a logic ONE must be available at least at one of the C1, C2 and C3 inputs to inclusive OR gate 80 of FIG. 1. This necessarily means that a wrong push button was actuated or it was actuated out of its proper sequence. If one positive pulse representing binary ONE state is applied at D, current will flow through capacitor 92 to partially charge such capacitor and provide a voltage thereacross insufficient to trigger gate 96 of silicon control rectifier 95. DC positive voltage is provided through normally closed contacts of push button 91 to element 97 of rectifier 95. To inhibit sufficient current from flowing in the gate trigger circuit, resistor 93 and diode 94 in series with gate 96 are provided. Of course gate 96 may be negatively biased through a resistor such as R connected between it and ground to provide bias to rectifier 95 and prevent current conduction therethrough until the bias is overcome. With bias at gate 96, no current will flow through rectifier path 97 and 98 and hence no power will be supplied to tone oscillator 99. But with a second or additional pulse provided at D, capacitor 92 will be provided with additional charge to result in a greater potential difference across the capacitor sufficient to drive a current through resistor 93 and diode 94 combination or to overcome the bias at electrode 96, to raise the potential of electrode 96 positive and permit current to be conducted through push button 91, path 97 and 98 and provide power to tone oscillator 99. Once the power is applied to oscillator 99 it will continue to be energized and emit a very loud audible tone that would frighten anyone tampering with the lock. To disable the tone oscillator, it will be necessary for one having the proper combination to open the lock, enter and depress push button 91 momentarily, which will cut the current flow through rectifier 95 and reset the alarm circuit to normal. The advantage of requiring at least two pulses at D to activate alarm circuit 90 is that it will then be impossible for one tampering with the system to ascertain any given digit of the preselected combination as the one tampering would not know which of the push buttons depressed was the wrong button.

Referring to FIG. 9, an alternating current to direct current converter is shown therein to provide the DC power to the system and to continuously charge rechargeable batteries. Such provision enables the system to normally be powered from the alternating current mains while at the same time maintain a reserve DC power source is workable condition, so as to enable opening of the locking means in case of a power failure in the mains. The components used are conventional to the art and detailed description of the power converter-charger is not necessary.

The circuitry for the exclusive OR logic gates may also if desired consist of an inverter in series with one of the input terminals of a two input terminal AND gate.

All of the semiconductor logic circuits may for economy of production be an integrated circuit, the art of producing same being well known. The selector switches 30, 40 and 50 may at least as far as the stationary contacts thereof, and also the stationary contacts of push buttons 0 through 9, be made by printed circuit techniques for economy of production and combined on the same substrate as the integrated circuits. This would have the additional advantage of enabling miniaturization of all components except the locking mechanism 65.

Figure 10:
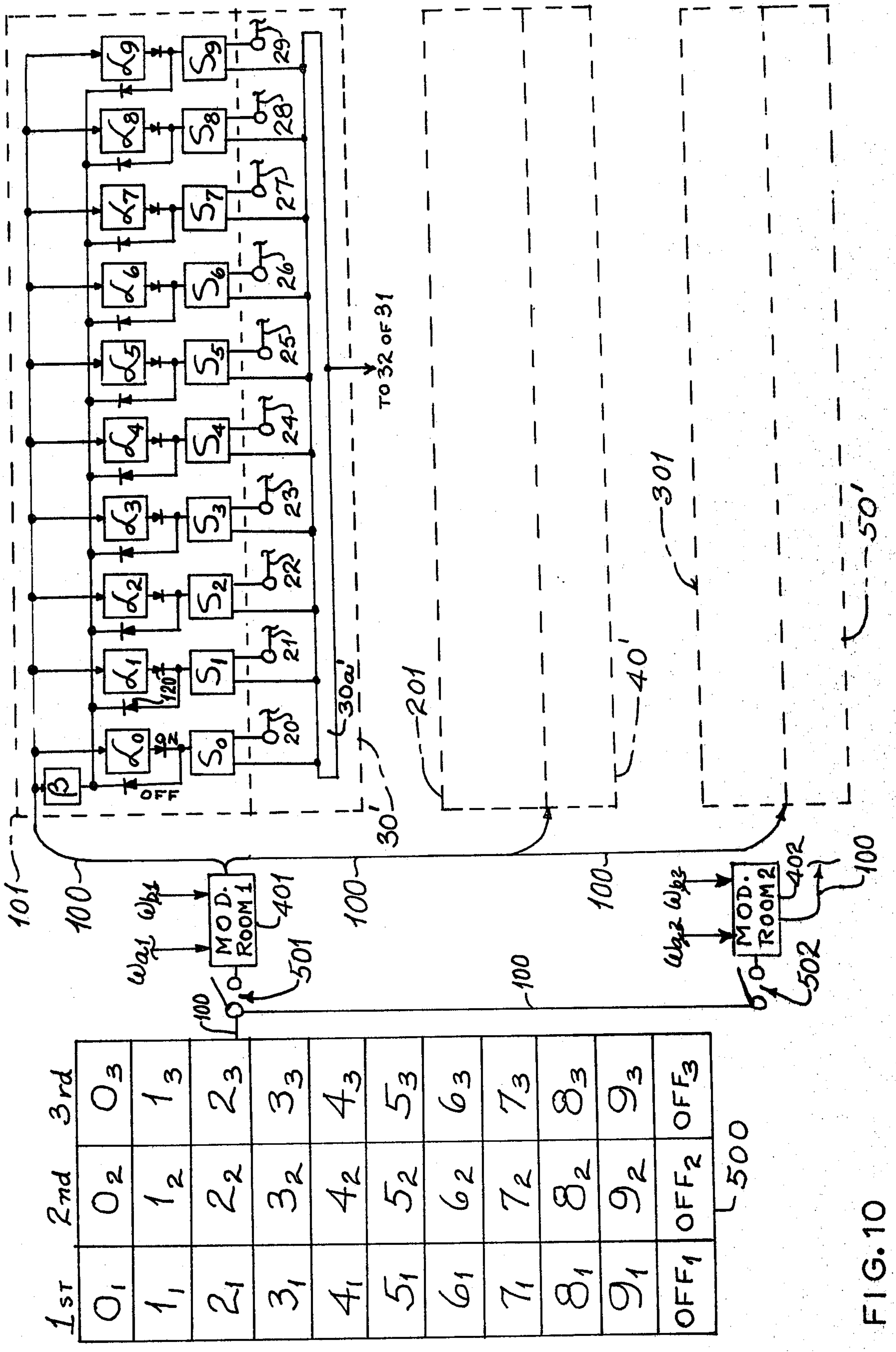
FIG. 10 is a system schematic showing a master control panel, a cable system, a modulation subsystem and a filter and switching system connected to combination selectors in one or more of the digital combination locks to enable remote presetting or clearing of combinations therein.

Referring to FIG. 10, a system, utilizing the locking system of FIG. 1, discloses methods for remotely presetting the combinations in selectors, such as selectors 30, 40 and 50 of FIG. 1. Such selectors are shown in FIG. 10 as 30', 40' and 50' wherein 40' and 50' are of identical structure as that of 30', and are shown in phantom notation. In use of a remote controlled combination selection system, selectors 30', 40' and 50' would be substituted for selectors 30, 40 and 50 respectively.

Such remote controlled selection system is usable in large industrial installations or hotels where frequent change of combinations to locked rooms or areas is desired, so as to change any of the lock subsystems as illustrated in FIG. 1, but where for convenience, such combinations may be set or reset from a remote location or from more than one remote locations, if desired.

A master remote selector is provided at 500. Such selector, tailored to a three digit combination for simplicity of illustration and for compatibility with the illustration in FIG. 1 locking device, will adequately illustrate the remote control method. Master selector 500 has three columns, labled 1st, 2nd and 3rd respectively. The 1st column has 11 circuits which are denoted as $0_1$ through $9_1$ and $OFF_1$; the 2nd column has eleven circuits denoted as $0_2$ through $9_2$ and $OFF_2$; and the 3rd column has eleven circuits denoted $0_3$ through $9_3$ and $OFF_3$. Each of these denoted circuits is operated by an individual push button, and it will be understood that the above denoted symbols each signifies an individual push button which when manually depressed operates an oscillator having a unique frequency provided as an output to cable 100 for ultimate transmission to selectors 30', 40' and 50'. In the 1st column, one of these unique frequencies will be provided by $1_1$ circuit fot example, through cable 100 to one of the filters termed $\alpha_0$ through $\alpha_9$, but specifically match the frequency characteristics of filter $\alpha_1$ to be used to trigger switch $S_1$. Hence, when switch 501 is closed, and modulator 401 is by-passed (short-circuited so that a direct connection is made between means 500 and cable 100), then if the push button associated with oscillator at $1_1$is depressed, a unique frequency generated by oscillator at $1_1$ will be sensed only by filter $\alpha_1$, and not by any other filters, to set up the first selector to be responsive only when push button 1 of FIG. 1 is depressed. This is accomplished by providing a virtual short circuit between terminal at 21 and bar at 30*a'* triggered by selection circuit 101. When the wrong selection is made, depressing the push button at $OFF_1$ will provide another unique frequency to cable 100 as input to filter $\beta$, which will operate to remove any preset combination within 30', that is any short circuit imposed between any of terminals 20–29 and bar 30*a'* will be removed, thereby clearing the 1st column and hence the first selector 30' of any combination imposed.

In a similar manner, selection circuits 201 having identical configuration to that of circuits 101, sets up a combination digit selected by the 2nd column, within selector 40'. Similarly, the selection circuits 301 also having identical configuration to that of circuits 101, sets up a combination digit as selected by the 3rd column, within selector 50'. Filters in selection circuits 201 and 301 are all different in frequency response characteristics, but equal in band width, as compared to circuits within 101, and each of these filters sense a different frequency provided to it by means of cable 100.

Each of filters $\alpha_0$ through $\alpha_9$ and $\beta$ at 101 are fed through diodes 120 to switches $S_0$ through $S_9$ respectively. Diodes 120 for each of the switches constituted a pair thereof in opposite direction of conduction of current therethrough, providing pulse signal inputs by rectification of the oscillating signals supplied by filters to switches $S_0$ through $S_9$, respectively, of the proper electrical polarity when any of push buttons of the 1st column is depressed. Likewise, similar switches similarly structured with diodes as inputs thereto are provided in selection circuits 201 and 301.

Selector 30' has a bar 30*a'* connected to trigger electrode 32 of silicon controlled rectifier 31 of FIG. 1. Like connections are made with respect to selectors 40' and 50'.

In the foregoing description, selection control to one room or area by remote presetting of combination digits, was broadly described. However, it is obvious that cable 100 can be used to remotely set up combinations for room two by first closing switch 502 and short-circuiting or by passing modulator 402 so that frequencies set up by device 500 may be channeled to other rooms via cable 100 and to circuits similar to those described above as at 101, 201 and 301.

Figure 11:
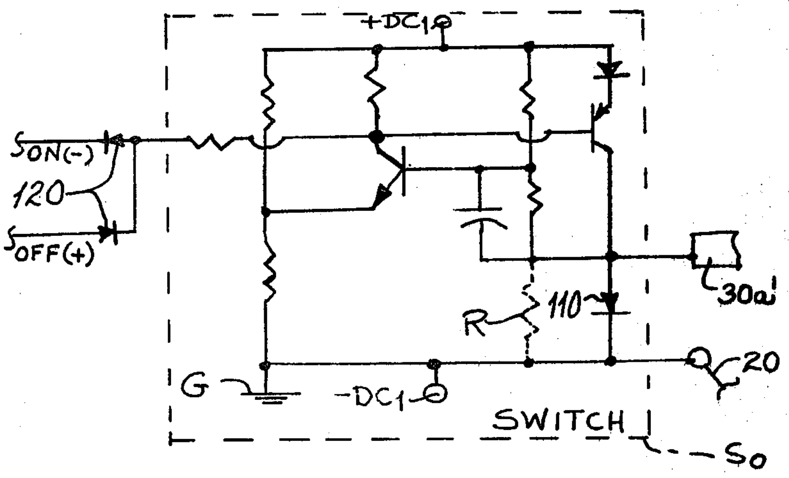
FIG. 11, 12 and 13 each show an exemplary one of the switchs of the switching system as used in FIG. 10.

Referring to FIG. 11, details of any of switches $S_0$ through $S_9$, but shown as $S_0$ is illustrative of electronic switches usable in this system. In this figure, it will be noted that diodes 120 are in reversed direction of current conduction to those shown in FIG. 10, which is due to the type of semiconductor transistors used in this switch, which transistors have conductivities that are opposite to those of the switches used in FIG. 10.

Figure 12:
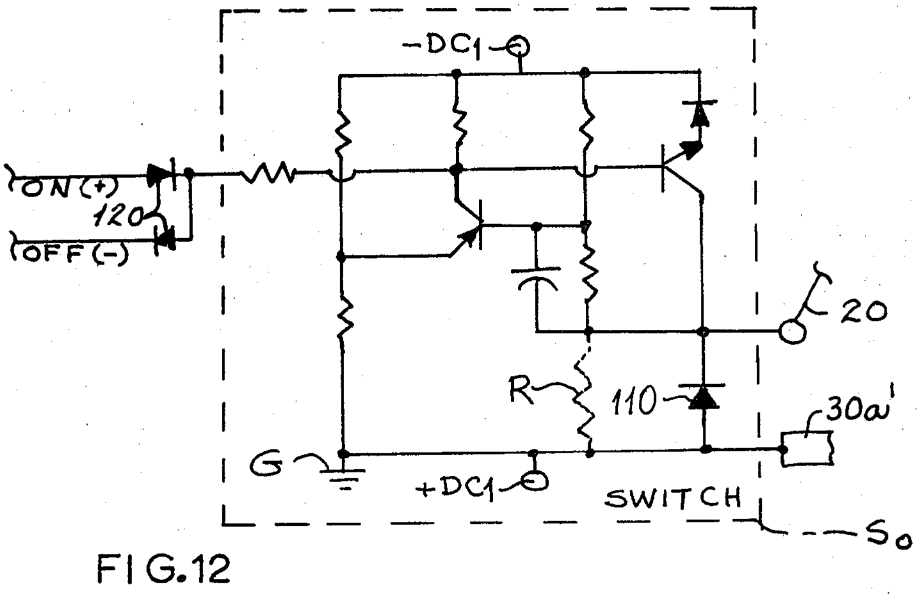

FIG. 12 has transistors therein of conductivities opposite to those of FIG. 11, but the same as those used in FIG. 10.

In either case, it is immaterial whether FIGS. 11 or 12 circuits are used within FIG. 10, paying attention to the proper connection of diodes 120, inasmuch as the results are the same, namely a virtual short circuit is obtained between the selected one of terminals 20–29 and 30*a'* for example, when an ON signal is imposed upon $S_0$ by virtue of push button at $0_1$ of 1st column of 500 being depressed, providing current through the ON switching diode and hence an electrical path between 30*a'* and any terminal such as at 20. It should be noted that diode 110 is so connected so that in its non-conductive state, a high resistance to current flow is encountered. It is beneficial to provide a high resistance between all terminals 20–29 and 30*a'* except the particular terminal selected to act as the desired digit combination. Resistance R is generally one that has about 10 or more times the forward resistance value of diode 110, so as to help maintain regenerative feedback in switch $S_0$ and thereby maintain current through diode 110 when $S_0$ is switched ON. An OFF pulse of polarity opposite to the ON pulse provided as input to switch $S_0$ will shut switch $S_0$ off, and cause current flow in diode 110 to cease. The OFF pulse is supplied by $\beta$ frequency as input through its associated diode into switch $S_0$, as well as all other switches in the same column of master control 500. It should be noted that power source $DC_1$ provided to these switches is different from power source as provided in FIG 1, and that ground G provided herein as a signal return path is different from the ground shown in FIG 1.

Switch configuration in FIG. 12, with diode 110 and resistor R substituted for a lamp therein, is shown in "Sourcebook of Electronic Circuits" by Markus, at page 436, copyright 1968 by Mc Graw Hill Book Company, New York City. Switch of FIG. 11, is an obvious derivation of the switch of FIG. 12, having the same parameter values except transistors of opposite conductivies, and naturally requiring opposite potentials applied thereto as well as having diodes connected in opposite direction for obtaining switch activation.

Figure 13:
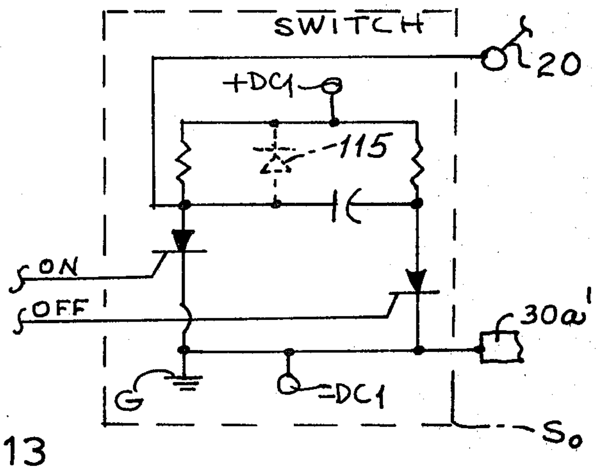

FIG. 13 shows a switch performing functions idenical to that of switches in FIGS. 11 and 12 but utilizing silicon controlled rectifiers. This switch does not required diodes at its input for the ON or OFF functions, since the gates of the silicon controlled rectifiers provide such functions. Pulses are applied to the gates to trigger the switch ON or OFF. Whether such pulses are negative or positive depends on the particular silicon controlled rectifier (SCR) design. This switch may have diode 115 connected between positive DC input and the anode of the SCR and conducting during the ON mode if the circuit to which the switch is connected exhibits an inductive load. This switch is shown in General Electric Company SCR Manual, 3rd Edition, copyright 1964, at page 110. Other suitable SCR switches may be found in General Electric Transistor Manual, 2nd Edition, copyright 1964, at pages 391–413.

No discussion of construction of filters $\alpha_o$ through $\alpha_9$ or $\beta$ filters need be made since two typical narrow band active filters usable in this system is shown in "Sourcebook of Electronic Circuits", by Markus, at page 220, copyright 1968 by Mc Graw Hill Book Company, New York City.

No discussion concerning oscillators as used in master control 500 need be provided, nor of modulators such as 401 or 402, since these are well known in the art.

It should be noted that in the discussion above, frequencies generated by oscillators at 500 were received directly by filters $\alpha_o$through $\alpha_9$and $\beta$, by passing modulators as at 401 and 402.

Such by pass of modulators is practical in medium size installations possibly handling not more than 75 rooms or secure areas.

If we have a 6 digit combination, 66 oscillators, each having a unique frequency, will be involved in the master control unit 500.

For 75 rooms or areas, $66 \times 75 = 4950$ different frequencies will be required, or more simply, 75 individual units such as at 500, or means (not shown) for switching in to unit 500 some 75 different sets of frequencies would be needed to use only one cable 100.

A more practical resolution, however, is to have only one master control unit 500 and one cable system 100 with 66 unique frequencies, each having a bandwidth of about 10 cycles per second, of the type shown in the "Sourcebook" as quoted above at page 220. Low frequency carrier signals can then be used, in which case only $\omega_a$ carrier frequency need by utilized as inputs to the modulators. With 100 carriers, one for each room or area, each set of filters such as in units 101, 201 and 301 may be serviced by one carrier $\omega_{a1}$, externally inputted to the modulator, and modulated by the particular unique one of the 66 frequencies provided by master control 500. Discriminators, well known in the art, built into the input ends of filters $\alpha_o$ through $\alpha_9$ and $\beta$ for the particular carrier $\omega_{a1}$ will dispose of the carrier and pass the low frequency signal to the remainder of the filter as an input through one of diodes 120 into switches $S_o$ through $S_9$, as above discussed. In this instance, where 75 rooms or areas are involved, 75 modulators such as at 401 or 402 with respective switch inputs as at 501 and 502 will be needed. In such installations it will be possible to utilize either an ordinary utility power line or an inexpensive telephone line as cable 100.

Where a larger number of areas or rooms need be serviced, too many signal sources such as $\omega_a$ would be required as carriers and the system would become unduly expensive.

Hence, as shown in FIG. 10, it is possible to provide a multiplicity of carrier signals, exemplified by $\omega_{a1}$ and $\omega_{b1}$ as inputs to modulator 401, and similarly to all other modulators such as modulator 402, one modulator per room or secure area.

This modulation method may be used to combine such plurality of carrier signals to produce a number of unique carriers, as determined by the mathematical relationship:

$$N!/[K!(N-K)!]$$

where N is the number of carrier frequencies available, and K is the number of such carrier frequencies taken at the one time, to combine and create a number of unique carrier frequencies with a minimum number of basic carrier oscillators.

Where $\omega_a$ consists of 100 carrier frequencies and $\omega_b$ also 100 carrier frequencies, there will be available a total of 400 carriers due to intermodulation of $\omega_a$and $\omega_b$. It has been shown by applicant in his U.S. Pat. No. 3,651,282 that the result of intermodulation of frequencies will provide sum and difference frequencies of the carrier fundamental components which will double the sum of the $\omega_a$ and $\omega_b$ carriers.

In applying the foregoing mathematical relationship, $N = 400$, $K = 2$, resulting in development of 79,800 unique carriers.

Such system will supply virtually every conceivable installation, and the same set of 66 low frequency signals may be used to modulate each of these unique carriers. In such configuration, a separate modulator as at 401 with its switch 501 will be provided for each of the locks controlled, and hence each modulator will be allocated to only one of such rooms with its associated digital lock.

Audio signals ranging between 500 and 1500 cycles per second having a bandwidth each of 10 cycles per second, and a spacing of 10 cycles between each band, will provide adequate numbers of signals to be used to accommodate the requirements of the oscillator matrix for master control 500, so as to modulate each unique carrier, resulting from intermodulation of $\omega_a$ and $\omega_b$ signals. Since the band width is very narrow, the resultant carriers need not be greater than 100 cycles wide with 100 cycle separation therebetween. This means that if $\omega_a$ and $\omega_b$ are selected so as to provide unique carriers in the kilocycle range, a carrier band between 50 and 1500 kilocycles will provide 5000 unique carriers, more than adequate even for a large installation. Such low frequency carriers can be handled by simple telephone lines comprising cable 100, and without the need of utilizing expensive coaxial cables. Obviously, each of the filters $\alpha_o$ through $\alpha_9$ and $\beta$ in such instance, will have at their head ends a tuned LC circuit as commonly used for the AM broadcast band, tuned to the particular carrier frequency assigned to the particular room. It is also quite possible to utilized power lines in certain instances with these low frequency carriers to serve as cable system 100.

Of course it is obvious that the output of the modulators instead if being connected to cable 100 or other hard wire connection, may be connected to a transmitting antenna, and the inputs to circuits 101, 201 and 301, etc. to a receiving antenna or antennae, in situations where hard wire cables are not feasible or expensive.

What is claimed is:

1. Digital combination locking means having an alarm circuit, comprising the combination:

a plurality of push buttons;

combination selection means electrically connected to the push buttons, each one of the combination selection means having capability of being preset to any one of 10 digit positions;

an inclusive OR gate, each of said push buttons being connected to the input of said inclusive OR gate and to said combination selection means;

a plurality of semiconductor switches serially interconnected directly to each other, electrically connected to each of the push buttons, said switches being sequentially activated during operative mode of said locking means when said push buttons are momentarily depressed in a preselected order determined by particular settings of the combination selection means;

lock means in series circuit with the last in sequence of activation of said switches;

a plurality of logic means, connected to the inclusive OR gate and the combination selection means, for obtaining from each of said plurality of logic means a binary logic ZERO output when inputs thereto are of the same logic state and for obtaining a binary logic ONE output therefrom when inputs thereto are of different logic states; and additional logic means connected to the plurality of logic means for activating said alarm circuit.

2. The invention as stated in claim 1, including time delay reset means serially interposed between the push buttons and the first in sequence of activation of said switches.

3. The invention as stated in claim 1, wherein each of th plurality of semiconductor switches is a silicon control rectifier.

4. The invention as stated in claim 1, wherein each of the combination selection means is a ten position switch.

5. The invention as stated in claim 1, where said plurality of logic means and said additional logic means comprises respectively:

a plurality of exclusive OR gates; and another inclusive OR gate connected to the plurality of exclusive OR gates.

6. The invention as stated in claim 1, wherein the alarm circuit comprises:

a capacitor connected to the output of the additional logic means;

a silicon control rectifier having a gate electrode which is electrically connected to said capacitor; and a tone oscillator in series with said silicon control rectifier.

7. The invention as stated in claim 6, including a normally closed push button in series circuit with the silicon control rectifier and the tone oscillator.

8. The invention as stated in claim 1, including:

means, electrically coupled to the combination selection means, for presetting said combination selection means with a predetermined combination from a location remote from the location of said digital combination locking means.

9. The invention as stated in claim 8, wherein said means for presetting also provides the capability of remotely clearing any preset combination within said digital locking means from said remote location.

10. The invention as stated in claim 8, wherein said means for presetting comprises:

master combination selection control means; and electronic controls, electrically coupled to the master control means, comprising a plurality of filters each having a unique frequency response characteristic and a plurality of electronic switches responsive to outputs from said filters.

11. The invention as stated in claim 10, including hard wire cabling between said master control means and said electronic controls.

12. The invention as stated in claim 10, including carrier frequency fed modulators interposed between the master control means and the electronic controls.

13. The invention as stated in claim 10, wherein each of the plurality of electronic switches has a diode connected across its output with electrical current flowing through said diode during the conductive phase of the switch thereby providing a virtual short circuit across the output of said switch.

14. The invention as stated in claim 10, wherein each of the electronic switches has a pair of diodes connected at its input with one electrode of each of the diode pair that is oppositely polarized being joined at said input.

* * * * *

UNITED STATES PATENT OFFICE
CERTIFICATE OF CORRECTION

PATENT NO. : 4,095,239

DATED : June 13, 1978

INVENTOR(S) : Martin E. Gerry

It is certified that error appears in the above-identified patent and that said Letters Patent are hereby corrected as shown below:

Column 2, Line 45: between "stages....as" insert --such--
Column 3, Line 23: between "trigger....42" insert --electrode--
Column 3, Line 35: between "trigger....52" insert --electrode--
Column 4, Line 36: delete "emitter and" and substitute --the emitter and through--
Column 4, Line 37: delete "alone" and substitute --alone,--
Column 4, Line 40: delete "ground" and substitute --ground,--
Column 4, Line 42: delete "bias" and substitute --bias,--
Column 4, Line 52: between "in....emitter" insert --the--
Column 5, Line 2: before "it" insert --since--
Column 5, Line 28: after "in" insert --the--
Column 5, Line 32: between "in....emitter" insert --the--
Column 5, Line 46: delete "current" and substitute --current,--
Column 5, Line 47: delete "70a" and substitute --70a,--
Column 5, Line 58: after "that" insert --a--
Column 6, Line 32: delete "combination as" and substitute --combination, inasmuch as--
Column 6, Line 48: delete "two input terminal" and substitute --two-input-terminal--
Column 7, Line 32: between "with....oscillator" insert --the--

UNITED STATES PATENT OFFICE

CERTIFICATE OF CORRECTION

PATENT NO. : 4,095,239

DATED : June 13, 1978

INVENTOR(S) : Martin E. Gerry

It is certified that error appears in the above-identified patent and that said Letters Patent are hereby corrected as shown below:

Column 7, Line 38: between "between....terminal" insert --the-
Column 7, Line 38: delete "and bar at 30a' triggered" and substitute --and the bar at 30a', triggered-
Column 8, Line 9: between "room....two" insert --number--
Column 9, Line 24: delete "by passing" and substitute --by-passing--
Column 9, Line 26: delete "by pass" and substitute --by-pass--

Signed and Sealed this

*Twenty-third* Day of *January 1979*

[SEAL]

*Attest:*

RUTH C. MASON
*Attesting Officer*

DONALD W. BANNER
*Commissioner of Patents and Trademarks*